(12) United States Patent
Watson et al.

(10) Patent No.: US 6,446,730 B1
(45) Date of Patent: Sep. 10, 2002

(54) EQUINE HOOFWARE

(76) Inventors: Todd Watson, P.O. Box 4092, Bergheim, TX (US) 78004; Kristy Jo Watson, P.O. Box 4092, Bergheim, TX (US) 78004

(*) Notice: Subject to any disclaimer, the term of this patent is extended or adjusted under 35 U.S.C. 154(b) by 0 days.

(21) Appl. No.: 09/797,545

(22) Filed: Mar. 1, 2001

(51) Int. Cl.$^7$ ............................................. A61L 1/00
(52) U.S. Cl. ................................................... 168/24
(58) Field of Search .................... 168/6, 24; D30/147

(56) References Cited

U.S. PATENT DOCUMENTS

| | | | | |
|---|---|---|---|---|
| 1,030,478 A | * | 6/1912 | Messacar ..................... | 168/24 |
| 1,122,472 A | * | 12/1914 | Busse ........................... | 168/24 |
| 5,287,931 A | * | 2/1994 | Eriksson ....................... | 168/24 |
| 5,566,765 A | * | 10/1996 | Ovnicek ....................... | 168/24 |
| 5,727,633 A | * | 3/1998 | Ovnicek ....................... | 168/24 |

* cited by examiner

*Primary Examiner*—Charles T. Jordan
*Assistant Examiner*—Elizabeth Shaw
(74) *Attorney, Agent, or Firm*—Jackson Walker LLP

(57) ABSTRACT

The present invention relates to hoof protection and in particular, to a shoe fabricated from a resilient material. The shoe consists of a raised arcuate member and recessed longitudinal and recessed interconnecting member. A preferred embodiment includes a trim guide for fitting the shoe, a curved leading edge and a recessed frog guard to ensure natural splaying and protection of the hoof during use.

9 Claims, 3 Drawing Sheets

EQUINE HOOFWARE

FIELD OF THE INVENTION

The present invention relates to hoof protection and, in particular, to a shoe which allows the natural biomechanics of the hoof to operate while affording protection.

BACKGROUND OF THE INVENTION

The present invention relates to hoof protection and, in particular, to a horseshoe fabricated from a non-metallic material and designed to protect a hoof by imparting conformance of hoof movement akin to that of healthy, active, unshod horses living in a natural environment. The invention relates to a horseshoe which has the ability to flex so as to assume a shape and width that aids in the natural splaying of the hoof. In addition, the invention relates to a horseshoe which includes a resilient material for attenuating shock and vibration associated with use and to provide maximum traction.

Horseshoes have been used for centuries in order to afford protection to the horse's hoof and to enhance performance. Most horseshoes in use today are made of metal such as steel, aluminum alloys, and, rarely, stainless steel or titanium. Aluminum alloys are most commonly used today in racing and such are characterized by relatively low weight and expense. Alternatively, horseshoes are also made from various plastics, rubber, or composite materials. However, plastic, rubber. or composite horseshoes have not substantially replaced more conventional metal horseshoes in the marketplace. This is largely due to the existence of outstanding questions or problems regarding the durability, weight, expense, biomechanical functionality, or possible adverse health effects associated with such horseshoes. In particular, the use of some plastic materials and/or the adhesives used to bond the plastic horseshoe to a horse's foot has sometimes led to illness, as these materials can release chemicals which are capable of migrating or diffusing through the horse's hoof into the horse's body.

The surfaces on which horses perform also vary widely. Horses frequently move about on natural ground of grass, sand, cinder, crushed stone, and sometimes on packed surfaces which nearly approach the hardness of asphalt or cement. The hardness and texture of surfaces can greatly increase the effective rate of loading, thus, the shock and vibration which may affect the hoof. Such will necessarily influence the nature of the impact on the hoof transmitted by use. The factors of use directly affect the horse's efficiency, and the amount of trauma that will be experienced by the hoof. Accordingly, it can be understood that the potential for injury is large whenever horses navigate on surfaces that are detrimental to the hoof.

The teachings of the present invention can be better appreciated if the biomechanical events associated with the phenomena under discussion are understood. The method by which the hoof of a horse contacts the ground and propels a horse forward may contribute to an understanding of the present invention. What normally happens as a horse's hoof impacts the ground is that the back of the hoof touches first, then the hoof flattens and slides forward skating across the surface. In particular, this is true of the horse's rear hoof when the rear portion of the hoof is loaded and splaying takes place. This will generally cause the hoof to rotate backwards at the heel. The hoof will then rotate forward and recover to a relatively neutral position. Subsequently, the hoof rapidly rotates forward about a rocker point located between the geometric center of the hoof and a short distance behind the anterior-most area of the toe as the hoof breaks over and the toe-off takes place, thus, ending the ground support phase and beginning the flight phase.

It is known that the hoof of an active unshod horse living in a natural environment will wear such that the front and back of the hoof become gently rounded. In fact, horseshoes which were initially substantially rectangular in cross section wear in these areas and eventually enable a combination of a horse's hoof and horseshoe to assume a somewhat similar shape. Unfortunately, many conventional horseshoes are so constructed as to require replacement by the time this more natural configuration is attained. The propulsive phase occurs when the hoof is used to propel the horse. The ability of a horse's hoof to slide somewhat can also enhance the stability when a horse's hoof will suddenly catch or grab the ground. Of course, the presence of extremely loose or slippery ground can neutralize the possible adverse affects of such traction devices and, in fact, such may provide better performance and safety in such circumstances.

It is also known that the hoof of an active unshod horse living in a natural environment will assume a slightly arcuate concave shape in the toe area between the medial line and lateral sides as when viewed from the front and also along sides of the hoof between the toe and the heel. This configuration permits the hoof to better slide or plane over the ground support surface during the impact phase as impact takes place, thereby reducing the effective rate of loading and the shock and vibration experienced.

Furthermore, it is known that in the unshod natural state a horse's foot will flex and slightly widen when it is loaded. Discussion of this known phenomena is found in U.S. Pat. No. 4,513,824 granted to Donald F. Ford on Apr. 30, 1985. The use of a relatively rigid metal or aluminum horseshoe substantially prevents this natural movement and so tends to reduce both the effective size and the shock and vibration absorbing capability of a horse's foot. A plastic horseshoe is known to be more flexible in this regard than an aluminum, steel, or titanium horseshoe. It is believed that the occurrence of hoof cracks is sometimes caused by the flexing and widening action of the foot and hoof working against the nails associated with a substantially inflexible horseshoe.

It is known that, when shod, the downward movement of the center of the horse's foot can sometimes impact the inner upper edge of a conventional horseshoe, as such may not perfectly fit the shape of the horse's foot or otherwise accommodate for this movement. Horses engaged in use by riding are commonly re-shod every four to six weeks. This is done in consideration for the wear incurred by the horseshoes, but also by the desire to maintain a healthy geometry with respect to the configuration of the hoof and to facilitate optimal biomechanics during use of the hoof.

One of the challenges encountered when attempting to reduce the rate of loading, and attenuate the shock and vibration experienced by a horse is posed by the fact that a horse is a rather large animal, commonly weighing between 800 and 1,400 pounds and, when running at speeds of 30 to 40 miles per hour, the load can exceed 15,000 pounds at each step. Accordingly, approximately 2,600 pounds per square inch can be placed upon a typical horseshoe having roughly 6.5 square inches of working surface. By way of comparison, humans commonly experience something in the range of approximately 18 pounds per square inch when running on asphalt in quality athletic footwear. The most distal bone proximate on the horse's hoof corresponds to the most distal phalange in the tip of the finger or toe of the human hand or foot. All things considered, it is perhaps surprising that equine injuries are not more common.

The prior art confers some advantages over the unshod hoof in that the traditional metal horseshoe protects the hoof from injury due to sharp objects and uneven wear of the hoof and further provides means of traction greater than that afforded a naturally existing hoof. Disadvantages of the prior art include the fact that the frog portion of the hoof, when unprotected during use, has an increased likelihood of injury from the lack of frog protection. Further, the natural splaying of the hoof experienced by the horse during use is impeded to the rigid nature of the prior art. Still further, the recessed portion of the present invention allows maximum natural splay of the horse's hoof while still protecting the hoof and the frog portion of the hoof from contact with sharp objects.

SUMMARY OF THE INVENTION

An object of the present invention is to provide a horseshoe that will facilitate the natural widening and flexing movement of the horse's foot and hoof while still providing the protection and wear afforded by conventional horseshoes.

A further object of the present invention is to provide a horseshoe with space for flexation and expansion of the frog area of the horse's hoof as the horse's foot is loaded.

It is an object of the present invention to reduce the rate of loading and attenuate the shock and vibration which is experienced by a horse when walking or running.

It is an object of the present invention to provide a horseshoe that allows the frog portion of the hoof to naturally expand as weight is put upon the hoof.

It is an object of the present invention to provide a recessed frog protector such that even when undergoing splaying the frog is protected.

It is further an object of the present invention to allow the sole portion of the hoof to be sufficiently exposed to the ambient air so as to inhibit diseases commonly associated with the binding of the hoof.

It is an object of the present invention to provide a horseshoe which does not substantially elevate the horse's hoof above the height of conventional metal horseshoes, thus, minimizing the possible introduction of instability.

A further object of the present invention to minimize the amount of plastic or rubber material which is placed in communication with the horse's hoof.

Further, an object of the present invention is to use plastic or rubber materials which are known to be relatively harmless and not subject to such degradation.

An object of the present invention is to have the shoe directly in contact with the hoof thereby avoiding squirming of the horseshoe, damage to the nails, damage to the shoe itself, and perhaps catastrophic loss of a horseshoe during use.

A further object of the present invention is to provide a light weight shoe to avoid trauma to joints and connective tissue and alterations in a horse's biomechanics, or a way of going which can be inefficient and result in interference.

It is further an object of the present invention to reduce the magnitude of the loads, shock, and vibration as may be experienced by the horse during walking or running.

A further object of the present invention is to provide superior traction to the horse so that locomotion is enhanced.

A further object of the present invention is to provide a rollover toe to avoid stubbing and aid in motion. The shape of the present invention allows fitting of both oval and round hoof shapes and uses a trim guide to aid in cutting away excess shoe.

DETAILED DESCRIPTION OF THE PREFERRED EMBODIMENT

Figure 1:
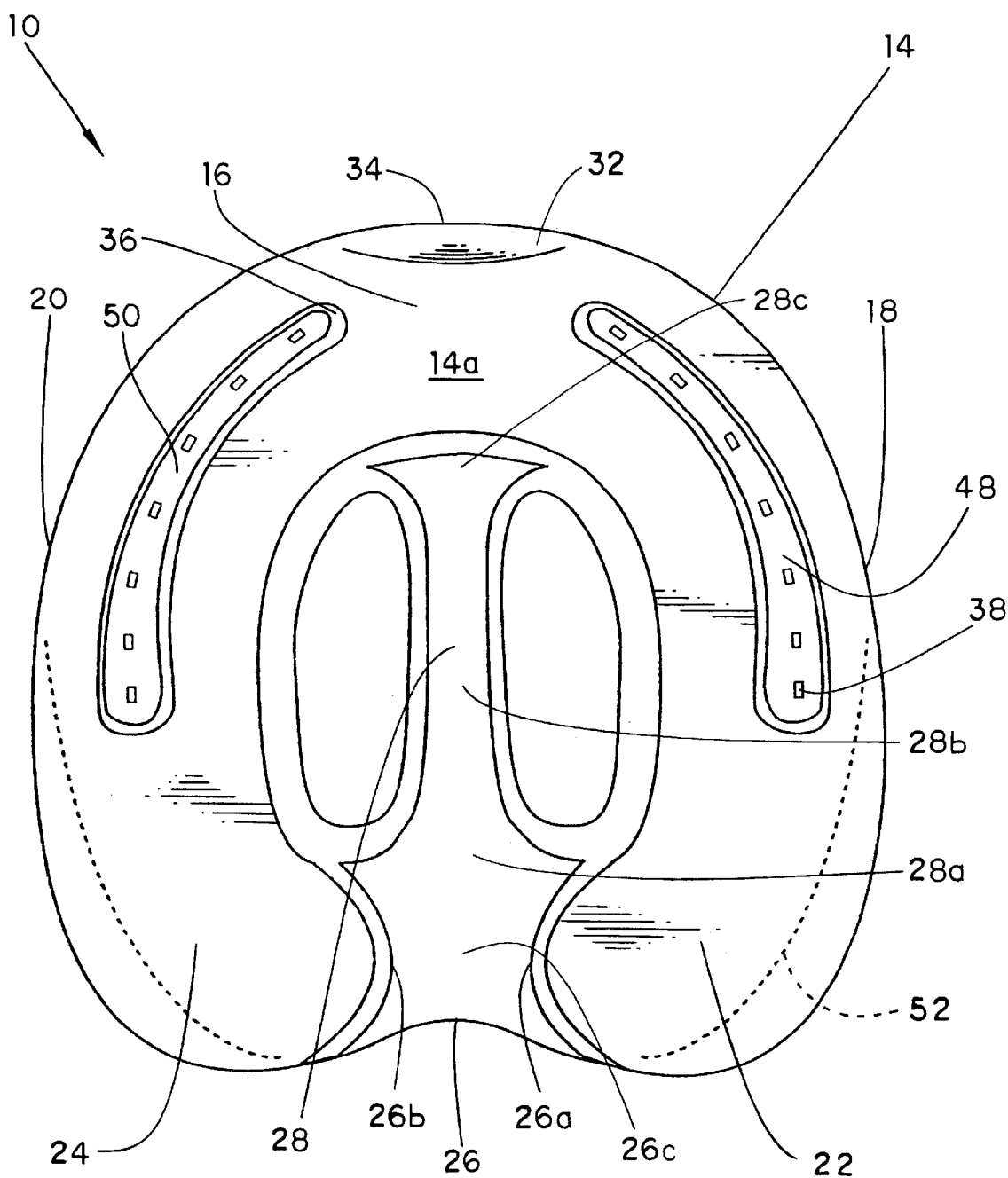
FIG. 1 shows a bottom elevational view of the horseshoe.

Referring now to the drawings, wherein like reference numerals designate the corresponding structure throughout the views, and referring in particular to FIG. 1, there is illustrated a view of applicants' novel horseshoe (10), having a bottom surface (12). The horseshoe (10) fabricated from an elastomeric material such as plastic, polyurethane, resin or other polymer, in accordance with the present invention. In general horseshoe (10) of the present invention has an overall configuration corresponding to the overall configuration of the hoof of a horse.

Viewed from bottom, FIG. 1, an arcuate member (14) is generally u-shaped and similar in outline to prior art horseshoe; and can be formed in a plurality of segments consisting of an apex (16), a first side member (18) and a second side member (20). The first side member (18) and the second side member (20) terminate at their respective first removed end (22) and second removed end (24).

An interconnect member (26) with a first end (26a) and a second end (26b) has a central portion (26c) located between the first end (26a) and the second end (26a) of the interconnect member (26). The first end (26a) of the interconnect member (26) is connected to the first removed end (22). The second end (26b) of the interconnect member (26) is connected to the second removed end (24). The stability of the unitary body style of the shoe is increased by the connection of the first removed end (22) and the second removed end (24) by the interconnecting member (26). The central portion (26c) of the interconnect member (26) is integrally connected to a longitudinal member (28). The second end (28a) of the longitudinal member (28) extends towards the apex (16) of the shoe. The second end (28a) of the longitudinal member (28) is integrally connected with the central portion (26b) of the longitudinal member (28), which central portion is likewise integral with the first end (28c) of the longitudinal member. The first end (28c) of the longitudinal member (28) is integral with the apex (16) of the arcuate member (14).

In a preferred embodiment, the interconnecting member (26) and the longitudinal member (28) are recessed from the bottom surface (12) of the horseshoe. The recessed interconnecting member (26) and the recessed longitudinal member (28) function to facilitate frog protection.

FIG. 1 also illustrates a preferred embodiment of the present invention showing a curved leading edge (32) of the horseshoe viewed from the bottom of the shoe. The curved leading edge (32) is situated at the leading edge of the nose portion (34) of the shoe, and facilitates locomotion by its position on the horseshoe by reducing friction to eliminate toe stubbing and increasing surface area of the shoe.

The sidewall (30) of the arcuate member substantially defines the peripheral wall of the horseshoe. At the nose portion (34) of the shoe, the sidewall transitions into the curved leading edge (32).

In a preferred embodiment, the first side member (18) and the second side member (18) contain walls defining a channel (36) for the placement of nails. The horseshoe is affixed to the hoof by use of common horseshoe nails directed through the shoe via the nail channels recessed to facilitate targeted entry of a nail by a farrier. FIG. 1 which reflects a plurality of guides (38) in the first channel (48) and the second channel (50) occupying the arcuate member (14). The nail guides (38) may be utilized as a guide by which nails may be driven through the horseshoe into the hoof to accomplish a secure fit between the horseshoe and the hoof. Another aspect of the present invention is the bottom surface (12) of the arcuate member (14) which has a trim guide (52) located such that a trimmable portion of the horseshoe may be removed/cut to properly size the shoe to fit hooves of various proportionate sizes.

Figure 2:
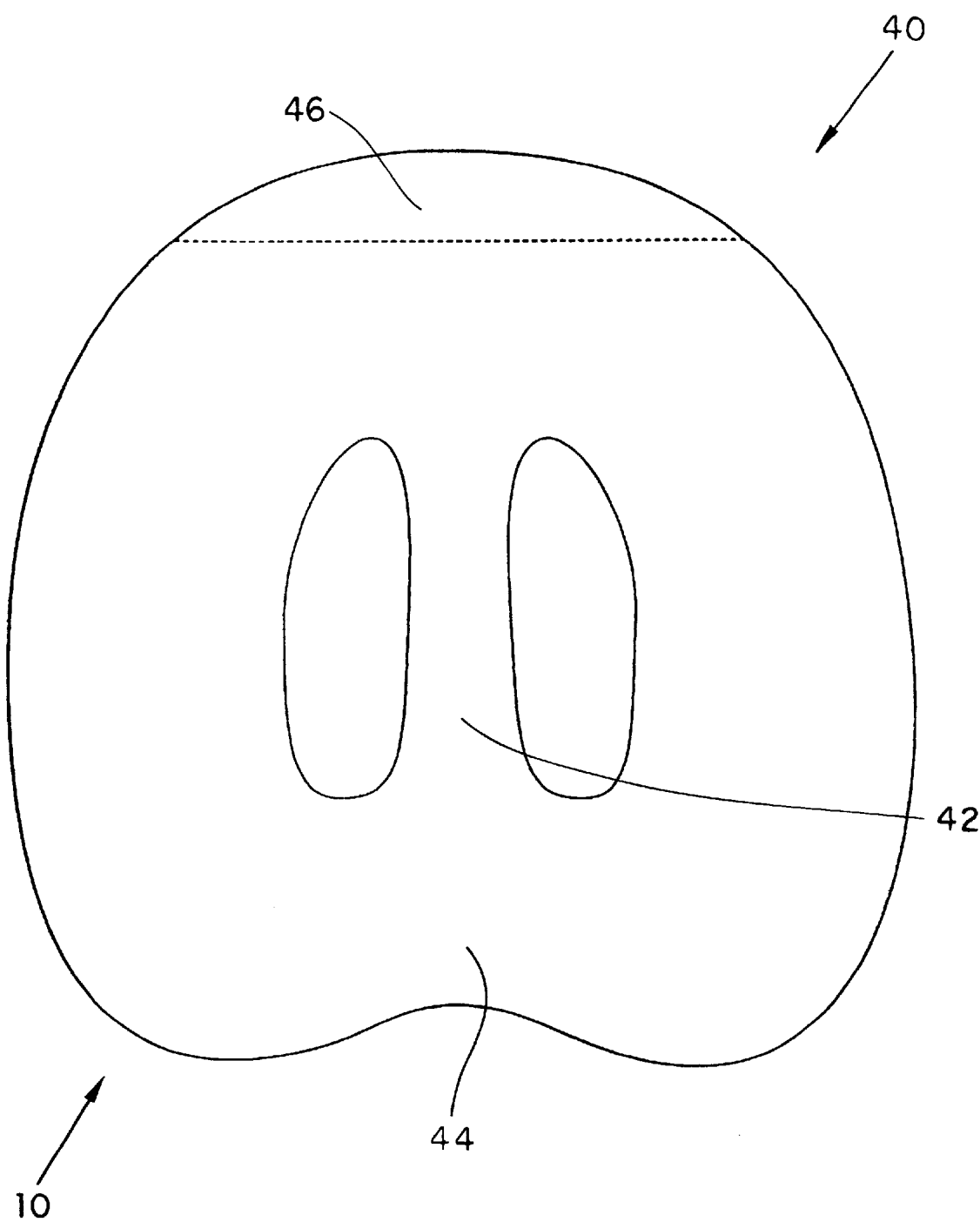
FIG. 2 shows a top elevational view of the horseshoe.

FIG. 2 is a top view of a preferred embodiment of the present invention showing the top surface of the arcuate member (40), the top surface of the longitudinal member (42) and the top surface of the interconnecting member (44) all meeting in flush relation to define a flat top surface. Also shown in the top view of a preferred embodiment of the horseshoe is the raised lip (46) which is situated at the leading edge of the nose (34) of the apex (16) of the horseshoe. The raised lip (46) serves to increase stability and fit of the horseshoe, and is designed to correspond to the leading edge of the hoof.

Figure 3:
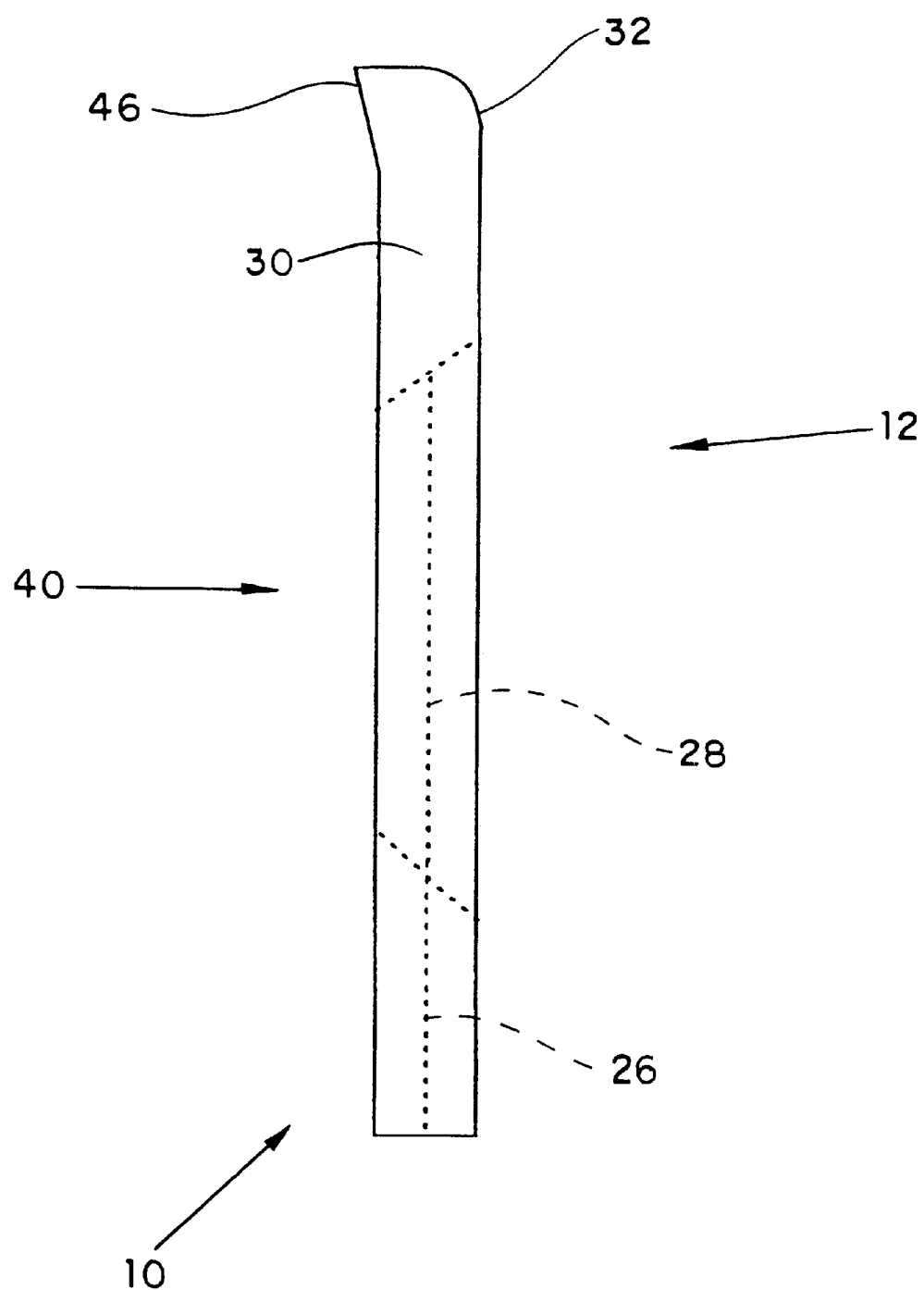
FIG. 3 shows a side view of the horseshoe.

With reference to FIG. 3, a side view of the horseshoe is illustrated depicting a preferred embodiment of the recessed longitudinal member (28) and the recessed interconnecting member (26) from the bottom side (12) of the horseshoe. The equivalent recession of the longitudinal member (28) and of the interconnecting member (26) aid in the natural disposition of the hoof during the splaying process undergone by the hoof in use. The raised lip (46) on the top surface (40) is also illustrated as it is situated on the leading edge of the nose (34) of the top surface (40). The curved leading edge (32) is also illustrated and contributes to the locomotion of the hoof.

We claim:

1. A horseshoe comprising:
    a raised arcuate member having a nose, a top surface, a bottom surface, and side walls, the raised arcuate member having opposed side members, including a first side member and a second side member of substantially identical dimensions, joined at an apex there between, the raised arcuate member having removed ends;
    a recessed interconnect member having a top surface and a bottom surface, having ends joining the removed ends of the raised arcuate member and a central portion between the ends of the recessed interconnect member;
    a recessed longitudinal member having a first and a second end, the first end joining the raised arcuate member at the apex thereof; the second end joining the recessed interconnect member at the central portion thereof;
    wherein the raised arcuate member and recessed longitudinal member include side walls defining a first longitudinal opening and a second longitudinal opening, and wherein the bottom surfaces of the raised arcuate member, the recessed interconnect and the recessed longitudinal member are joined in flush relation to form a planar bottom surface to the horseshoe.

2. A horseshoe according to claim 1 wherein the nose on the top surface of the arcuate member has a curved leading edge.

3. A horseshoe according to claim 1 wherein the nose on the bottom surface of the arcuate member has a raised lip.

4. A horseshoe according to claim 1 wherein said side members are imprinted with a trim guideline.

5. A horseshoe according to claim 1 wherein said removed ends are imprinted with a trim guideline.

6. A horseshoe according to claim 1 wherein the first side member has walls defining a channel, said channel having a plurality of hole marks situated along the length of the nail channel.

7. A horseshoe according to claim 1 wherein the second side member has walls defining a channel, said channels having a plurality of hole marks situated along the length of the nail channel.

8. A horseshoe according to claim 1 wherein the horseshoe is manufactured using a plastic, polyurethane, resin, or other polymer elastomeric material.

9. A horseshoe comprising:
    a raised arcuate member having a nose, a top surface, a bottom surface, and side walls, the raised arcuate member having opposed side members, including a first side member and a second side member of substantially identical dimensions, joined at an apex there between, the raised arcuate member having removed ends;
    a recessed interconnect member having a top surface and a bottom surface, having ends joining the removed ends of the raised arcuate member and a central portion between the ends of the recessed interconnect member;
    a recessed longitudinal member having a first and a second end, the first end joining the raised arcuate member at the apex thereof; the second end joining the recessed interconnect member at the central portion thereof;
    wherein the raised arcuate member and recessed longitudinal member include side walls defining a first longitudinal opening and a second longitudinal opening, and wherein the bottom surfaces of the raised arcuate member, the recessed interconnect and the recessed longitudinal member are joined in flush relation to form a planar bottom surface to the horseshoe;
    a nose on the top surface of the arcuate member having a curved leading edge;
    a nose on the bottom surface of the arcuate member having a raised lip;
    a side member imprinted with a trim guideline;
    a removed end imprinted with a trim guideline;
    a first side member having walls defining a channel, said channel having a plurality of holes and marks situated along the length of the nail channel; and
    a second side member having walls defining a channel, said channel having a plurality of holes situated along the length of the nail channel.

\* \* \* \* \*